(12) United States Patent
Oberheide et al.

(10) Patent No.: US 10,750,734 B2
(45) Date of Patent: Aug. 25, 2020

(54) AGRICULTURAL MACHINE AND CONTROL METHOD

(71) Applicants: AMAZONEN-WERKE H. DREYER GMBH & CO. KG, Hasbergen-Gaste (DE); HYDAC SYSTEMS & SERVICES GMBH, Sulzbach/Saar (DE)

(72) Inventors: Friedrich Oberheide, Bissendorf (DE); Frank Grosse Prues, Neuenkirchen-Vörden (DE); Timo Kiefer, Saarlouis (DE); Peter Kohl, Blieskastel (DE); Heinz-Peter Huth, Überherrn (DE); Georg Komma, Sankt Ingbert (DE); Martin Piechnick, Lohr (DE)

(73) Assignees: Amazonen Werke H. Dreyer GmbH & Co. KG, Hasbergen-Gaste (DE); Hydac Systems & Services GmbH, Sulzbach/Saar (DE)

( * ) Notice: Subject to any disclaimer, the term of this patent is extended or adjusted under 35 U.S.C. 154(b) by 46 days.

(21) Appl. No.: 15/546,151

(22) PCT Filed: Jan. 25, 2016

(86) PCT No.: PCT/EP2016/051400
§ 371 (c)(1),
(2) Date: Jul. 25, 2017

(87) PCT Pub. No.: WO2016/120181
PCT Pub. Date: Aug. 4, 2016

(65) Prior Publication Data
US 2018/0110213 A1 Apr. 26, 2018

(30) Foreign Application Priority Data
Jan. 25, 2016 (DE) .................. 10 2015 101 032

(51) Int. Cl.
*A01M 7/00* (2006.01)
*A01C 23/00* (2006.01)

(52) U.S. Cl.
CPC .......... *A01M 7/0057* (2013.01); *A01C 23/00* (2013.01); *A01M 7/0089* (2013.01)

(58) Field of Classification Search
CPC ............... A01M 7/0057; A01M 7/0089; F15B 2211/3057; F15B 2211/30525
See application file for complete search history.

(56) References Cited

U.S. PATENT DOCUMENTS

| RE31,023 E | * | 9/1982 | Hall, III | A01D 46/24 137/236.1 |
| 4,450,753 A | * | 5/1984 | Basrai | F15B 9/03 91/35 |

(Continued)

FOREIGN PATENT DOCUMENTS

| DE | 102007025751 A1 | 12/2008 |
| EP | 0 922 385 A1 | 6/1999 |

(Continued)

OTHER PUBLICATIONS

International Preliminary Report on Patentability dated Aug. 10, 2017 by the International Bureau of WIPO, translation provided.

(Continued)

*Primary Examiner* — Thomas E Lazo
(74) *Attorney, Agent, or Firm* — Mintz Levin Cohn Ferris Glovsky and Popeo, P.C.; Steven M. Jensen (57) ABSTRACT

An agricultural machine for discharging liquid includes a boom, a frame to which the boom is fixed such that the boom can be rotated about an axis of rotation pointing in the direction of travel, an actuating cylinder for rotating the boom about the axis of rotation, and a measurement and control system for the actuation of the actuating cylinder, wherein the actuating cylinder is mechanically connected to (Continued)

the frame on one side. The actuating cylinder is mechanically connected to the boom on the other side for the direct introduction of force. The actuating cylinder is formed as a double-acting actuating cylinder having a piston, to which pressure can be applied on both sides in order to move the boom in opposite directions of rotation.

8 Claims, 7 Drawing Sheets

(56) References Cited

U.S. PATENT DOCUMENTS

| | | | | |
|---|---|---|---|---|
| 4,727,791 | A * | 3/1988 | Satoh | F16D 48/066 91/363 R |
| 4,813,339 | A * | 3/1989 | Uno | F15B 11/0426 318/599 |
| 5,542,336 | A * | 8/1996 | Larkin | F15B 9/03 91/166 |
| 5,992,759 | A * | 11/1999 | Patterson | A01C 23/00 239/159 |
| 6,422,584 | B1 * | 7/2002 | Bittroff | B62D 47/025 267/186 |
| 6,834,223 | B2 * | 12/2004 | Strelioff | A01M 7/0057 239/167 |
| 7,216,578 | B2 * | 5/2007 | Mentink | F15B 11/042 91/421 |
| 7,686,124 | B2 * | 3/2010 | Hublart | B62D 3/14 180/402 |
| 8,353,642 | B2 * | 1/2013 | Munz | E01C 19/40 404/118 |
| 8,662,109 | B2 * | 3/2014 | Bill | F15B 13/0433 137/625.64 |
| 8,671,824 | B2 * | 3/2014 | Kauss | F15B 11/003 91/421 |
| 10,293,687 | B2 * | 5/2019 | Nozu | F16D 27/118 |
| 2009/0051130 | A1 * | 2/2009 | Huth | B60G 17/0152 280/5.514 |
| 2010/0229970 | A1 * | 9/2010 | Grigoleit | B23B 31/302 137/513 |
| 2011/0120296 | A1 * | 5/2011 | Hoshino | F15B 21/08 91/165 |
| 2013/0299601 | A1 * | 11/2013 | Ballu | A01M 7/0057 239/1 |
| 2014/0196996 | A1 * | 7/2014 | Ito | B05B 13/005 188/266.2 |

FOREIGN PATENT DOCUMENTS

| | | | | |
|---|---|---|---|---|
| EP | 167 095 | A1 | 1/2002 | |
| EP | 1167095 | A1 * | 1/2002 | A01M 7/0057 |
| EP | 1 444 894 | A1 | 8/2004 | |
| FR | 2529477 | A1 | 1/1984 | |
| FR | 2795913 | A1 | 1/2001 | |
| GB | 2025665 | A | 1/1980 | |
| WO | WO-2018215058 | A1 * | 11/2018 | A01M 7/0057 |

OTHER PUBLICATIONS

International Search Report issued in PCT/EP2016/051400 dated Apr. 18, 2016, translation from WIPO provided.
Written Opinion issued in PCT/EP2016/051400 uploaded to WIPO database dated Aug. 4, 2016.

* cited by examiner

AGRICULTURAL MACHINE AND CONTROL METHOD

BACKGROUND OF THE INVENTION

1. Field of the Invention

The invention is directed to an agricultural machine for discharging liquid. More particularly, the invention is directed an agricultural machine for discharging liquid, having a boom, a frame to which the boom is fixed so that it can be rotated about an axis of rotation pointing in the direction of travel, an actuating cylinder for rotating the boom about the axis of rotation, and a measurement and control system for operation of the actuating cylinder, and wherein the actuating cylinder is mechanically connected on the one hand to the frame.

2. Discussion of the Related Art

An agricultural machine is disclosed by EP 1 444 894 A1. The agricultural machines, also referred to as field sprayers, are used, for example, for discharging liquid fertilizers or pesticides. In order to discharge the liquids over the greatest possible working width on the field, field sprayers comprise a boom, which may be more than 20 m wide. Spray nozzles, which spray the liquid onto the ground, are fixed to the boom. For an optimum discharge of the liquid, the distance between the boom and the ground should remain as constant as possible over the entire width of the boom. This presents problems if the field sprayer is travelling in track ruts of different depth or in a furrow on one side. The parallel separation between ground and boom should also be adjustable on inclined ground.

The inclination adjustment of the boom is performed by hydraulic cylinders and spring damper systems, which are connected to the boom. Reference is made, for example, to FR 2 795 913 A1, EP 1 167 095 A1 and EP 0 922 385 A1. The known controls take the distance between the boom and the ground and/or the relative angle between the boom and the tractor as measured variables. The known controls have the disadvantage that they are imprecise and do now allow control in real time.

For this reason the field sprayer according to EP 1 444 894 A1 comprises a multilink suspension in which both the signals measuring the distance between the boom and the ground and also inclination signals, which give the relative inclination between the vehicle and the boom, are incorporated into the control. The boom is supported on a height-adjustable lifting frame so that it can be rotated about an axis of rotation pointing in the direction of travel. A rotatable subframe is mounted on the lifting frame coaxially with the boom. The subframe and the boom are coupled together by two centering springs and a damper. A hydraulic cylinder is provided between the subframe and the lifting frame.

To adjust the inclination the hydraulic cylinder is run in or out and turns the subframe in relation to the lifting frame. This lengthens one of the two centering springs and shortens the other. The spring force acting on the boom tensions the boom according to the movement of the subframe, so that the latter is re-centered in the inclined final position relative to the subframe. The centering springs moreover compensate for rapid relative movements between the vehicle and the boom, so that the position of the boom remains stable in operation.

The inclination control incorporates both the signals from the ground clearance measurement between the boom and the ground and an inclination signal, which constitutes a measurement of the spring force acting on the boom. The hydraulic cylinder can thereby be precisely controlled. Any oversteering of the boom is largely avoided.

However, this inclination control is slow. Furthermore, the construction with the subframe and the springs connected between the subframe and the boom is elaborate.

The object of the invention is to improve an agricultural machine of the aforesaid type in such a way that the inclination of the boom is controlled rapidly and precisely. A further object of the invention is to specify a control method for an agricultural machine.

SUMMARY OF THE INVENTION

The invention is based on the idea of specifying an agricultural machine for discharging liquid having a boom and a frame, to which the boom is fixed so that it can be rotated about an axis of rotation pointing in the direction of travel. The machine comprises an actuating cylinder for rotating the boom about the axis of rotation and a measurement and control system for operation of the actuating cylinder. The actuating cylinder is mechanically connected on the one hand to the frame. On the other the actuating cylinder is mechanically connected to the boom for the direct introduction of force. The actuating cylinder is embodied as a double-acting actuating cylinder having a piston, to which pressure can be applied from both sides in order to move the boom in opposite directions of rotation.

In contrast to the prior art, the invention dispenses with the subframe. For this purpose the actuating cylinder is mechanically connected, for the direct introduction of force, on the one hand to the frame, to which the boom is fixed, and on the other to the boom itself. The frame is a carrier frame on which the boom is suspended. This carrier frame may be a height-adjustable lifting frame, for example.

The invention obviates the need for the centering springs known in the prior art and they are eliminated. The force is introduced directly into the boom by the actuating cylinder, that is to say without any intermediate springs and/or dampers, in particular without any intermediate mechanical springs and/or dampers. The time lag occurring in the prior art due to the deformation of the springs is eliminated, so that the inclination control responds correspondingly faster.

For moving the boom in opposite directions of rotation the actuating cylinder is embodied as a double-acting actuating cylinder having a piston to which pressure can be applied from both sides. It has been shown that by means of an actuating cylinder directly connected to the boom and to the frame a secure and precise inclination adjustment is possible without the need for the centering springs known in the prior art. Oscillations of the boom are actively damped by the actuating cylinder. The elimination of the aforementioned components simplifies the construction of the machine.

Further embodiments of the invention are specified in the dependent claims. Thus the piston may comprise at least one piston rod, wherein the piston rod is fixed to the frame, and a housing of the actuating cylinder to the boom or vice-versa. This construction is of simple design, since the cylinder housing and the piston rod are fixed directly to the boom or the frame respectively.

The actuating cylinder may be a synchronous cylinder. This simplifies the control, since the hydraulics which serve to connect the two pressure sides of the actuating cylinder can be of symmetrical design. Alternatively, the actuating cylinder may be a differential cylinder.

In an especially preferred embodiment the actuating cylinder is connected to a hydraulic circuit, in particular to an open hydraulic circuit, which comprises at least one hydraulic pump and at least one control element, wherein a first line is connected to a first pressure side and a second line to a second pressure side of the actuating cylinder. A simple hydraulic circuit, in which the hydraulic pump provides pressure, which is switched to the respective pressure side of the actuating cylinder by means of the control element, suffices for operation of the actuating cylinder. The pump pressure and the volumes of fluid present in the open hydraulic circuit are not constant. It is therefore not possible and also not necessary to determine the linkage position.

The control element may have an operating frequency of at least 15 Hz, in particular at least 20 Hz, in particular at least 25 Hz in particular at least 30 Hz.

The hydraulic circuit may comprise at least one pressure accumulator, in particular two pressure accumulators, wherein the pressure accumulator or the two pressure accumulators are arranged hydraulically between the actuating cylinder and the control element. The pressure accumulator or the two pressure accumulators serve to absorb pressure peaks.

The two pressure accumulators may be connected directly to the actuating cylinder, in particular each connected directly to a pressure side of the actuating cylinder. Alternatively, the two pressure accumulators may each be arranged in the course of the first and second line and connected to these. According to a further alternative the hydraulic circuit may also be formed without any pressure accumulator.

The control element is preferably a directional control valve, in particular a 3-way directional control valve, which alternatively connects the first or second pressure side of the actuating cylinder to the hydraulic pump and the other pressure side to a reservoir. This embodiment, which serves to provide an open hydraulic circuit, is of particularly simple construction.

Alternatively, the control element may comprise two pressure control valves, which can each be connected to the pressure side of the actuating cylinder on the one hand and each alternatively connected to the hydraulic pump and a reservoir on the other.

With regard to the control method, the invention comprises a method for controlling the rotation of a boom of an agricultural machine for discharging liquid, having a boom, a frame, to which the boom is fixed so that it can be rotated about an axis of rotation pointing in the direction of travel, an actuating cylinder for rotating the boom about the axis of rotation and a measurement and control system for operation of the actuating cylinder, wherein the measurement and control system operates the actuating cylinder with a frequency of at least 15 Hz, in particular at least 20 Hz, in particular at least 25 Hz, in particular at least 30 Hz.

BRIEF DESCRIPTION OF THE DRAWINGS

The invention is explained in further detail, referring to the schematic drawings attached, in which.

DETAILED DESCRIPTION OF THE INVENTION

Figure 1:
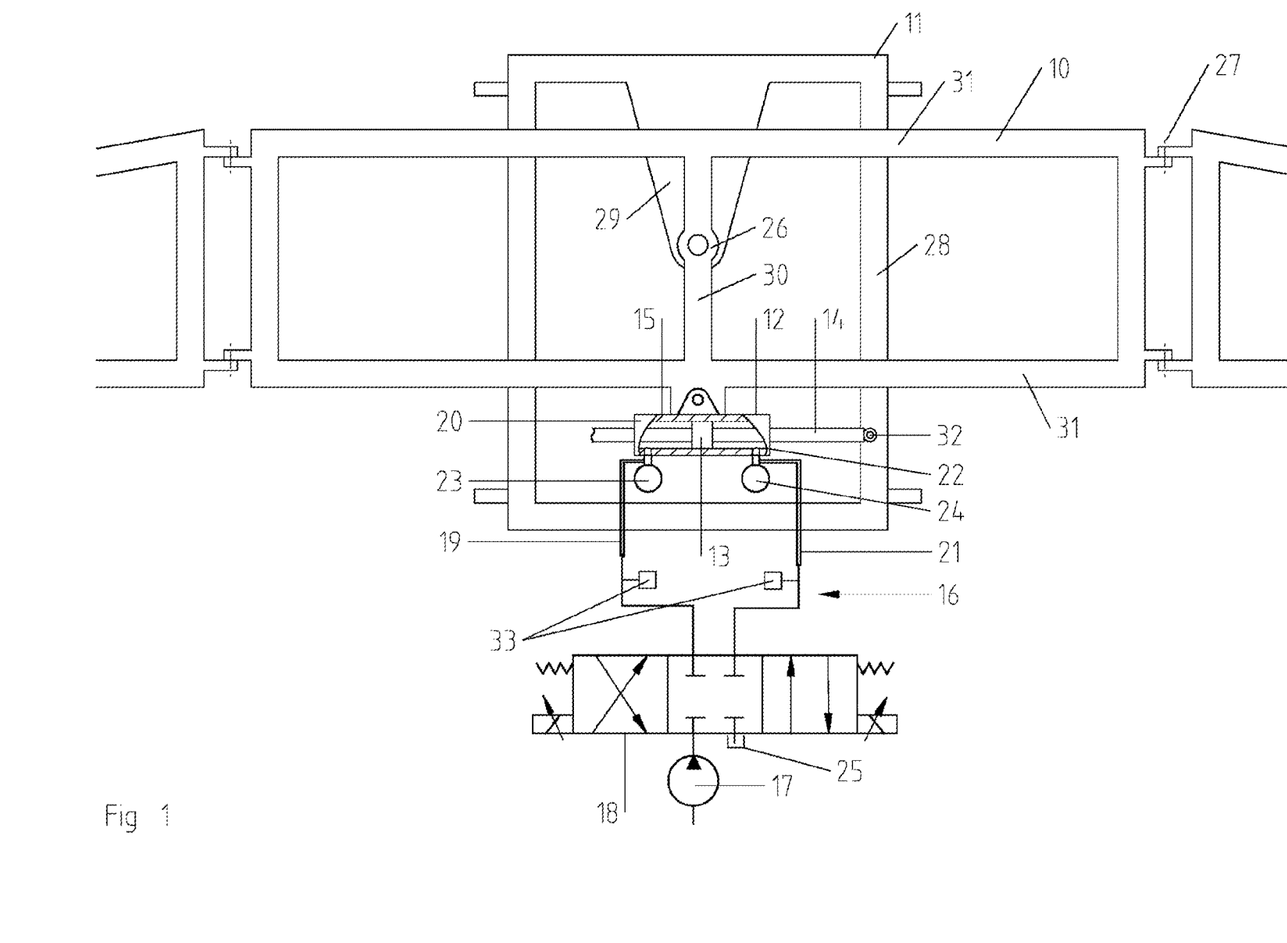
FIG. 1 shows a top view of the suspension of the boom on the frame with a schematically represented measurement and control system, in which two pressure accumulators are provided directly on the cylinder housing.

The schematic detail represented in FIG. 1 shows a boom 10, which is part of an agricultural machine, in particular field sprayer.

Such field sprayers may be designed as trailer field sprayers, for example, or as self-propelled field sprayers. The field sprayer comprises a chassis, on which a tank with a corresponding pump is mounted (not shown). The tank supplies the nozzles fitted to the bottom of the boom with liquid, which in operation is sprayed onto the ground and/or plants. The boom itself is designed to fold for traveling on the road. Such field sprayers are known in the art and are not described in more detail.

The frame represented in FIG. 1 is connected, rotationally fixed, to the chassis of the field sprayer. The frame 11 may be embodied as a height-adjustable lifting frame. The frame 11 forms a supporting frame with a plurality of struts 28. The struts 28 in FIG. 1 are interconnected in the form of a rectangle and afford a stable suspension for the boom 10. On what is the upper vertical strut 28 in operation, a downward protruding projection 29 is provided, in the lower area of which a pivot joint 26 is provided. The boom 10 is supported on the pivot joint 26 so that it can be rotated about an axis of rotation pointing in the direction of travel. Other possible bearing supports for the pivot joint 26, for example a strut arrangement, are equally possible, as are other frame geometries.

The boom 10 is embodied in a manner known in the art as a stable linkage and comprises a plurality of pivot joints 27 for folding the linkages in. Only the middle part and two adjoining linkage segments of the boom 10 are represented in FIG. 1. The boom 10 comprises a vertical strut 30, which connects two horizontal struts of the boom centrally in the area of the frame 11. The pivot joint 26 is arranged off-center on the vertical strut 30, more specifically somewhat above the middle of the strut.

For adjusting the inclination of the boom 10 an actuating cylinder 12 is provided, together with a measurement and control system for operation of the actuating cylinder 12.

The actuating cylinder 12 is mechanically connected to the frame 11 on the one hand and to the boom 10 on the other. As can be seen in FIG. 1, in the exemplary embodiment the actuating cylinder 12 is mechanically connected directly to the frame 11 on the one hand and directly to the boom 10 on the other.

A direct mechanical connection is taken to mean a connection in which force can be introduced directly into the boom 10 by the actuating cylinder 12. In contrast to this, in the actuating system disclosed by EP 1 444 894 A1 the force is introduced indirectly, because the centering springs are interposed in the power flow from the actuating cylinder to the boom. This is not the case in the exemplary embodiment according to FIG. 1, in which the forces are introduced directly into the boom 10.

More specifically, the actuating cylinder 12 in the exemplary embodiment according to FIG. 1 is embodied as a double-acting actuating cylinder, which comprises a piston 13 in a housing 15 of the actuating cylinder 12 to which pressure can be applied from both sides. The actuating cylinder 12 is a synchronous cylinder, in which the swept volumes are substantially equal on both sides of the piston 13. This is achieved by providing piston rods 14 with equal diameters on both sides of the piston 13.

One of the two piston rods 14 is mechanically connected to the frame 11. The connection is an articulated connection in order to allow a rotation of the actuating cylinder 12 about the pivot point 32. In other words, in operation the actuating cylinder 12 rotates about an axis of rotation running through the pivot point 32 and pointing in the direction of travel. The other piston rod 14 has a free end.

In the exemplary embodiment according to FIG. 1 the housing 15 of the actuating cylinder 12 is mechanically connected directly to the boom 10, more specifically to the lower of the two horizontal struts 31. Here too, the connection is an articulated connection which allows a rotation of the actuating cylinder 12 about an axis of rotation pointing in the direction of travel. The actuating cylinder 12 is thereby able to vary its initial position represented in FIG. 1 parallel to the boom 10 during the inclination adjustment.

It is possible to vary the connection between the actuating cylinder 12 and the frame 11 or the boom 10 represented in FIG. 1. For example, the piston rod 14 may be mechanically fixed to the boom 10, and the housing 15 of the actuating cylinder 12 to the frame 11 (kinematic inversion).

In the exemplary embodiment according to FIG. 1 the piston rod 14 is fixed directly to the vertical strut 28 of the frame 11. It is also possible to insert a rigid intermediate piece between the piston rod 14 and the vertical strut 28, in order to shorten the distance between the actuating cylinder 12 and the frame 11, if this is necessary. In this case, also, the force is introduced or transmitted directly from the frame 11 to the boom 10 by the actuating cylinder 12 without the use of any springs. The same applies to any rigid intermediate pieces between the boom 10 and the housing 15 of the actuating cylinder 12.

As is further shown in FIG. 1, the actuating cylinder 12 is connected to a hydraulic circuit 16. The hydraulic circuit 16 is an open circuit, which comprises a hydraulic reservoir 25 and a pump 17. A control element 18 is arranged between the pump 17 and the hydraulic reservoir 25 on the one hand and the actuating cylinder 12 on the other. The control element 18 connects the pump 17 and the hydraulic reservoir 25 to the two pressure sides 20, 22 of the actuating cylinder 12. For this purpose corresponding first and second lines 19, 21 are provided between the actuating cylinder 12 and the control element 18.

The control element is a proportional-directional control valve, which in a first operating position connects the first pressure side 20 to the pump 17 and the second pressure side 22 to the reservoir 25. In the second operating position the control element 18 connects the second pressure side 22 to the pump 17 and the first pressure side 20 to the reservoir 25. In the neutral position represented in FIG. 1 the pump 17 and the reservoir 25 are hydraulically separated from the actuating cylinder 12.

The control element 18, more specifically the valve, can be operated at a frequency of at least 15 Hz, in particular at least 20 Hz, in particular at least 25 Hz, in particular at least 30 Hz.

As can further be seen in FIG. 1, the housing 15 comprises two pressure accumulators 23, 24, which are flange-mounted directly onto the housing in the area of the first and second pressure side 20, 22. The two pressure accumulators 23, 24 serve to absorb pressure peaks.

Figure 2:
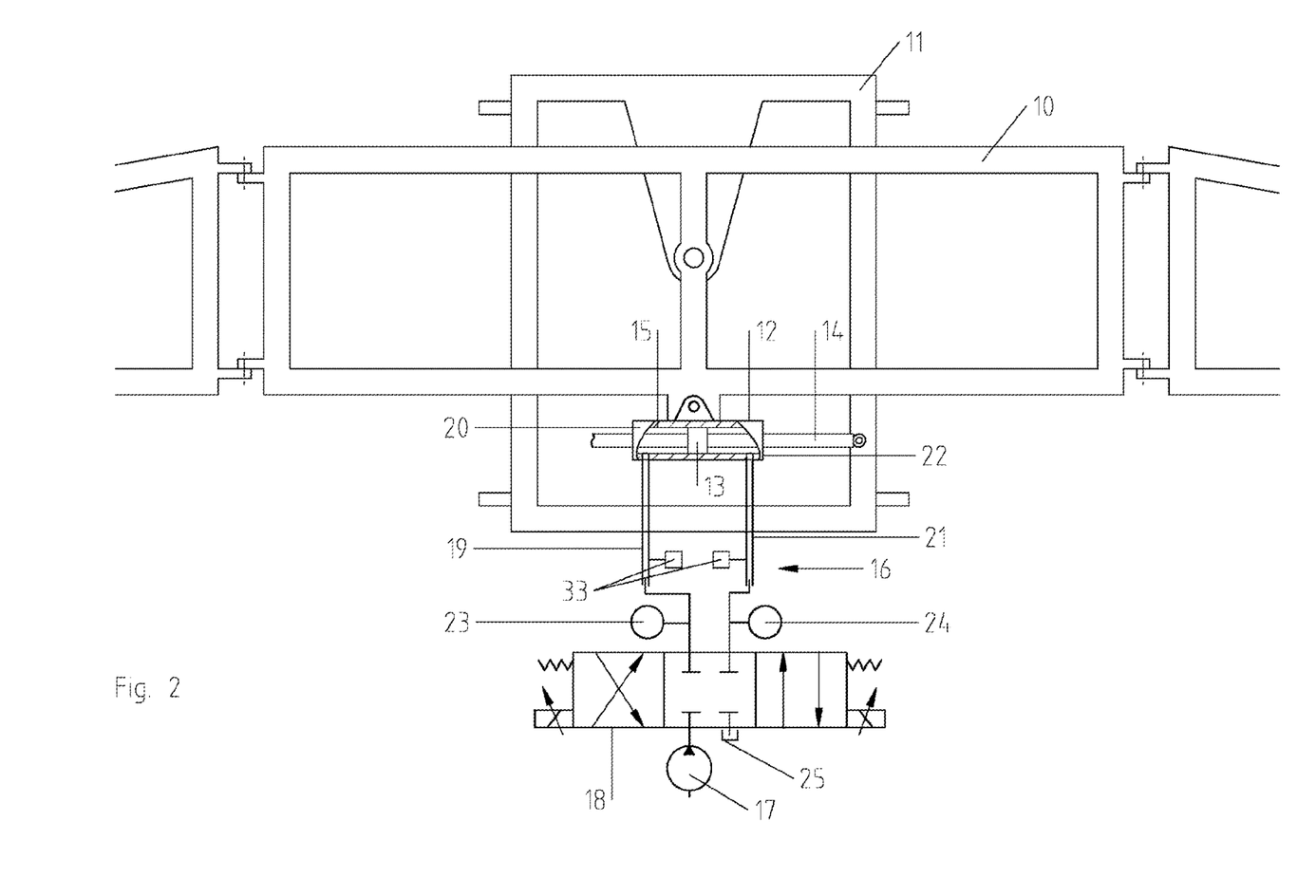
FIG. 2 shows the suspension according to FIG. 1, wherein the pressure accumulators are arranged in the course of the hydraulic lines.
Figure 3:
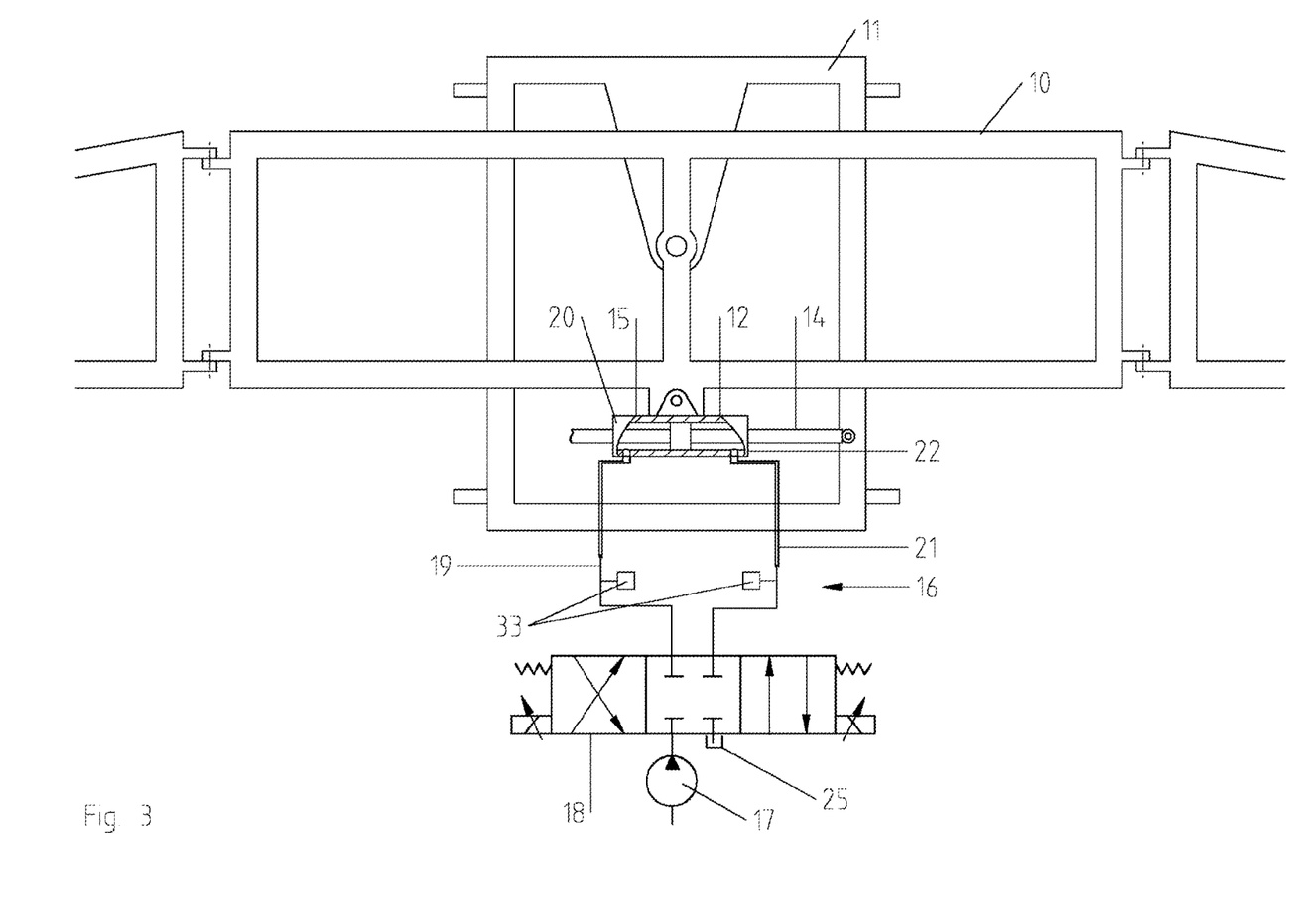
FIG. 3 shows the suspension according to FIG. 1, wherein the hydraulic circuit is formed without any pressure accumulator.

As shown in FIG. 2, the pressure accumulators 23, 24 may also be arranged in the course of the two lines 19, 21. It is also possible, as represented in FIG. 3, to dispense entirely with both of the pressure accumulators. The hydraulic circuit is then formed without any pressure accumulator. In other respects the exemplary embodiments according to FIGS. 2 and 3 correspond to the exemplary embodiment according to FIG. 1.

The measurement and control system further comprises sensors. Thus distance sensors, for example ultrasonic sensors (not shown), are provided on the underside of the boom on both sides of the pivot joint 26. More specifically, the ultrasonic sensors are arranged at the tips or longitudinal ends of the boom. Another arrangement is possible. The distance sensors serve to measure differences in height between the boom tips relative to the ground and/or the plant crop.

In addition, the measurement and control system comprises two pressure sensors 33, which measure the pressure in the two lines 19, 21 and emit corresponding signals, which are processed together with the signals from the distance sensors for controlling the control element 18. More specifically, the two pressure sensors 33 are arranged between the pressure accumulators 23, 24 and the control element 18. Another arrangement of the pressure sensors is possible, for example as part of the embodiment according to FIG. 2. Where pressure control valves are used as control elements 18, the pressure is controlled by means of the characteristic curves of the relevant valves. The pressure sensors are then not absolutely essential, but may be used in order to improve the control accuracy.

The signals from the pressure sensors allow active oscillation damping as part of the control system. Owing to the variable volume of oil in the hydraulic circuit, however, it is not possible to determine the position of any linkage on the basis of the oil pressure, nor is this necessary for control purposes. Further sensors for measuring parameters incorporated into the control, for example a rate of rotation sensor for measuring the rate of rotation of the boom, may be provided.

Figure 4:
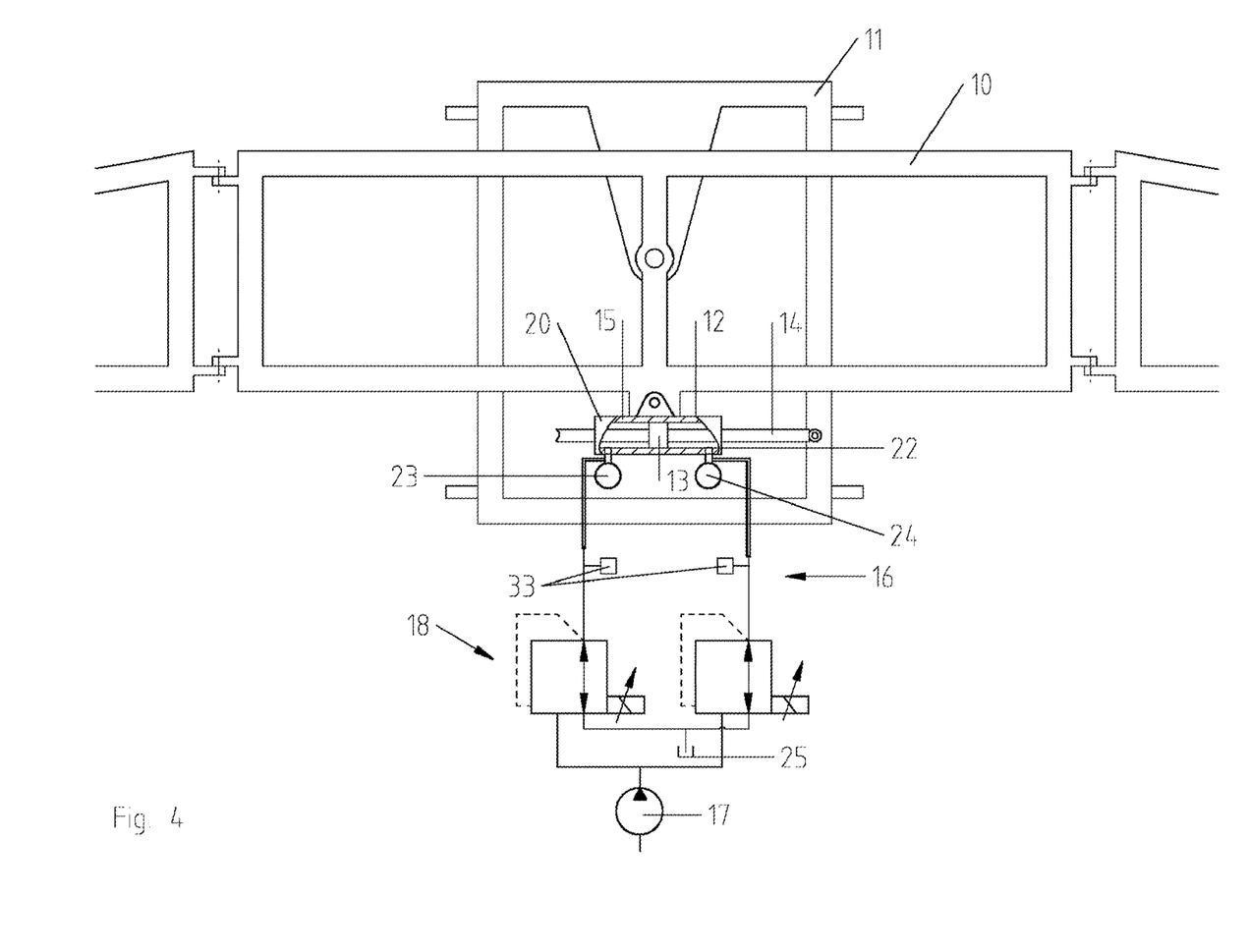
FIG. 4 shows the suspension according to FIG. 1, wherein two pressure control valves are provided instead of the 3-way directional control valve.
Figure 5:
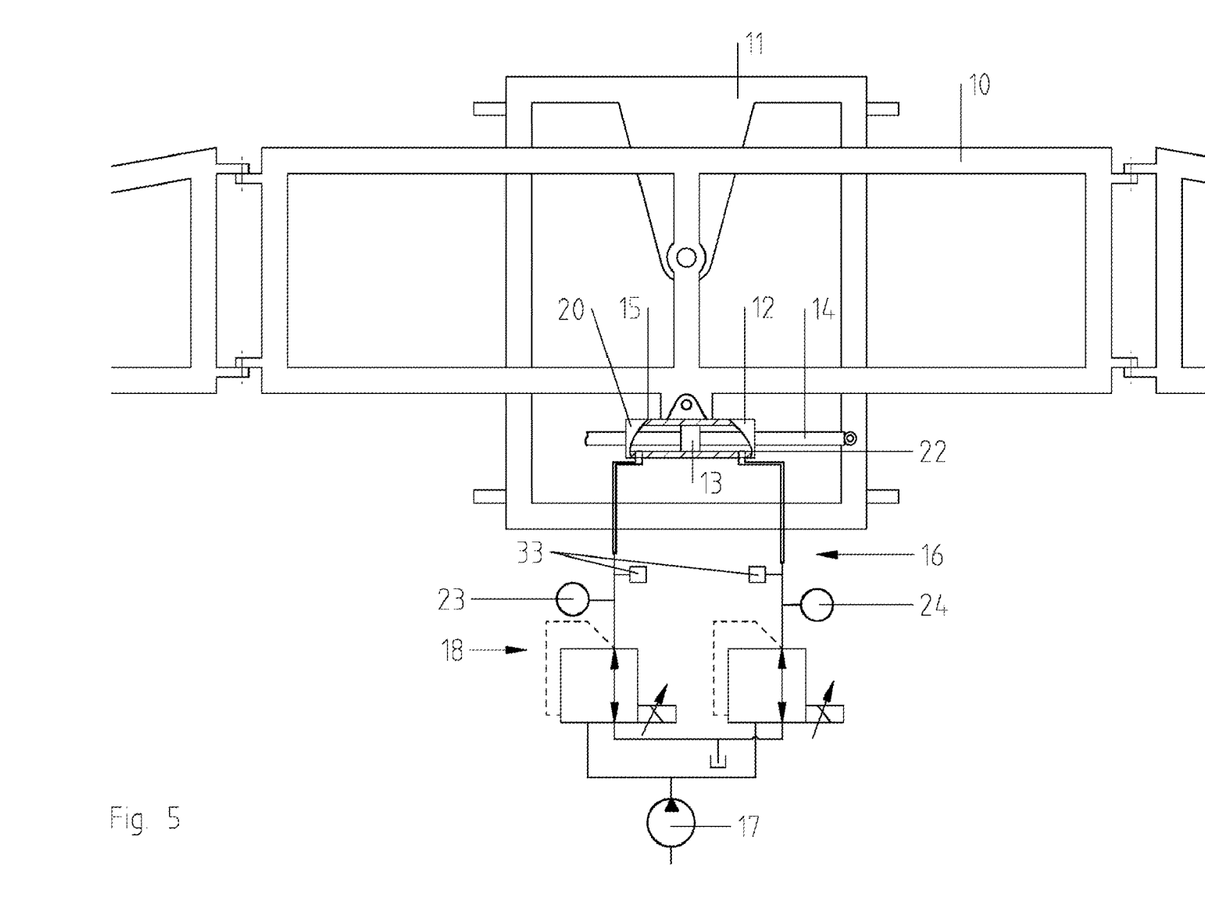
FIG. 5 shows the boom according to FIG. 4 with the pressure valves, wherein the pressure accumulators are arranged in the course of the hydraulic lines.
Figure 6:
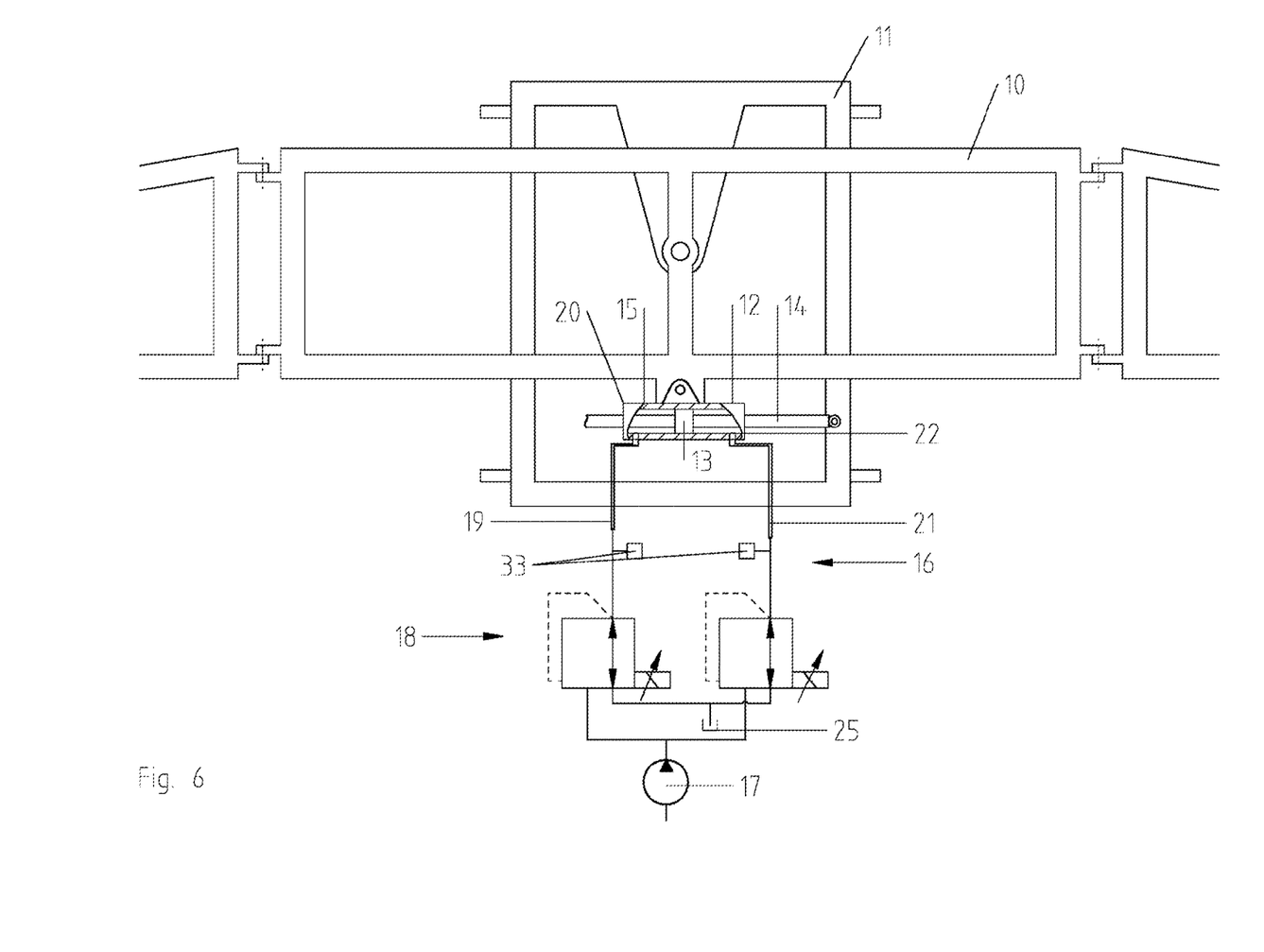
FIG. 6 shows the suspension according to FIG. 4, wherein the hydraulic circuit is formed without any pressure accumulator.
Figure 7:
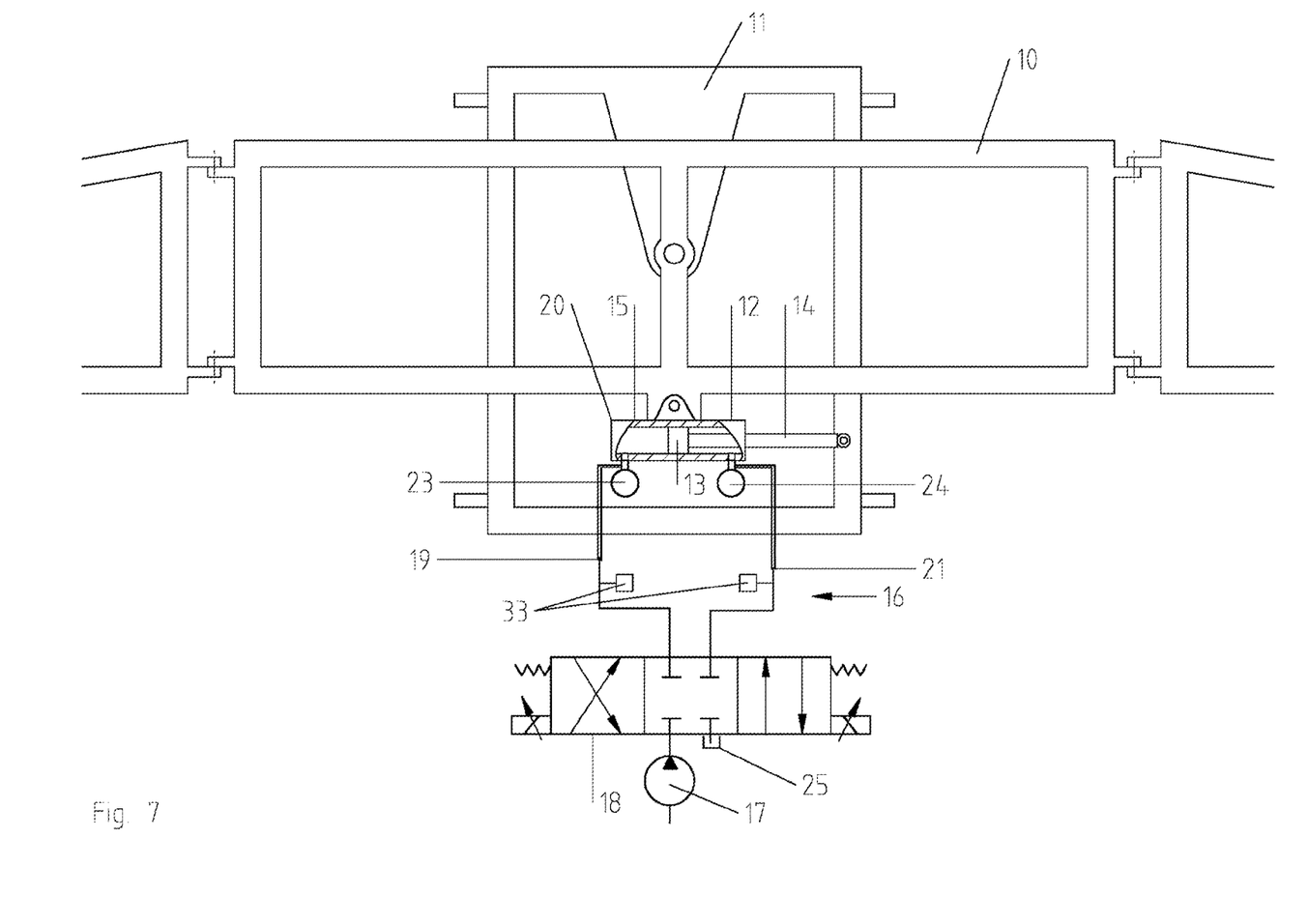
FIG. 7 shows the suspension according to FIG. 1, wherein a differential cylinder is provided instead of the synchronous cylinder.

The exemplary embodiments according to FIGS. 4, 5 and 6 correspond to the exemplary embodiments according to FIGS. 1 to 3, except for the control element 18, which in the exemplary embodiments according to FIGS. 4 to 6 is a pressure control valve. More specifically, two pressure control valves, in particular proportional pressure control valves are provided, which alternately connect the first pressure side 20 or the second pressure side 22 of the actuating cylinder 12 to the pump 17 and the reservoir 25. The sensors and the measurement and control system may be designed in the same way as described in connection with the exemplary embodiment according to FIG. 1. The difference between the exemplary embodiment according to FIG. 7 and the exemplary embodiment according to FIG. 1 is that instead of the synchronous cylinder according to FIG. 1 a differential cylinder is provided.

LIST OF REFERENCE NUMERALS 10 boom
11 frame 12 actuating cylinder
13 piston
14 piston rods
15 housing
16 hydraulic circuit
17 pump
18 control element
19 first line
20 first pressure side
21 second line
22 second pressure side
23, 24 pressure accumulator
25 hydraulic reservoir
26 pivot joint
27 pivot joints
28 vertical strut
29 projection
30 vertical strut
31 horizontal struts
32 pivot point
33 pressure sensors

The invention claimed is:

1. An agricultural machine for discharging a liquid, the agricultural machine comprising:
    a frame;
    a boom fixed to the frame, the boom rotatable about an axis of rotation, the axis of rotation being parallel to a direction of travel of the agricultural machine;
    a double-acting actuating cylinder comprising a piston, the actuating cylinder being mechanically connected to the boom, the actuating cylinder having an end being mechanically connected to the frame,
        the piston having a first pressure side and a second pressure side, the first pressure side being responsive to a first pressure applied to the first pressure side to move the boom in a first direction of rotation about the axis of rotation, the second pressure side being responsive to a second pressure applied to the second pressure side to move the boom in a second direction of rotation about the axis of rotation, and
        the first direction of rotation being opposite to the second direction of rotation;
    a measurement and control system for operating the double-acting actuating cylinder; and
    a hydraulic circuit, the hydraulic circuit comprising a hydraulic pump, a first line, a second line, and a control element,
    wherein the hydraulic circuit is connected to the actuating cylinder,
    wherein the first line is connected to the first pressure side and the second line to the second pressure side,
    wherein the control element comprises two proportional pressure control valves,
    wherein a first proportional pressure control valve of the two proportional pressure control valves is connected to the first pressure side and to one of the hydraulic pump or a reservoir,
    wherein a second proportional pressure control valve of the two proportional pressure control valves is connected to the second pressure side and to another of the hydraulic pump or the reservoir, and
    wherein pressure is controlled by characteristic curves of the two proportional pressure control valves.

2. The agricultural machine of claim 1,
    wherein the piston comprises a piston rod, the piston rod being fixed to the frame; and
    wherein the actuating cylinder comprises a housing, the housing being fixed to the boom.

3. The agricultural machine of claim 1, wherein the actuating cylinder is a synchronous cylinder.

4. The agricultural machine of claim 1, wherein the actuating cylinder is a differential cylinder.

5. The agricultural machine of claim 1,
    wherein the hydraulic circuit further comprises at least one pressure accumulator;
    wherein the at least one pressure accumulator are arranged hydraulically between the actuating cylinder and the control element.

6. The agricultural machine of claim 1,
    wherein the hydraulic circuit further comprises two pressure accumulators;
    wherein the two pressure accumulators are arranged hydraulically between the actuating cylinder and the control element;
    wherein a first pressure accumulator of the two pressure accumulators is connected directly to the first pressure side, wherein a second pressure accumulator of the two pressure accumulators is connected directly to the second pressure side.

7. The agricultural machine of claim 1,
    wherein the hydraulic circuit further comprises two pressure accumulators;
    wherein the two pressure accumulators are arranged hydraulically between the actuating cylinder and the control element; and
    wherein a first pressure accumulator of the two pressure accumulators is connected to the first line and wherein a second pressure accumulator of the two pressure accumulators is connected to the second line.

8. The agricultural machine of claim 1, wherein the hydraulic circuit is formed without any pressure accumulator.

* * * * *